(12) United States Patent
Bellmore et al.

(10) Patent No.: US 9,003,712 B2
(45) Date of Patent: Apr. 14, 2015

(54) METHOD OF MAKING A BULB SEAL

(75) Inventors: Brett P. Bellmore, Capac, MI (US);
Kevin Baxter, Goodrich, MI (US);
Stephen G. Leonard, Waterford, MI (US)

(73) Assignee: Edwards Industries, Inc., Sterling Heights, MI (US)

( * ) Notice: Subject to any disclaimer, the term of this patent is extended or adjusted under 35 U.S.C. 154(b) by 0 days.

(21) Appl. No.: 13/094,014

(22) Filed: Apr. 26, 2011

(65) Prior Publication Data

US 2011/0198778 A1 Aug. 18, 2011

Related U.S. Application Data

(62) Division of application No. 12/332,576, filed on Dec. 11, 2008, now Pat. No. 8,919,045.

(51) Int. Cl.
| B62D 65/08 | (2006.01) |
| F16J 15/02 | (2006.01) |
| B29C 53/48 | (2006.01) |
| B29C 65/58 | (2006.01) |
| B29C 65/00 | (2006.01) |
| B29L 31/26 | (2006.01) |

(52) U.S. Cl.
CPC ............... *F16J 15/027* (2013.01); *B29C 53/48* (2013.01); *B29C 65/58* (2013.01); *B29C 66/1122* (2013.01); *B29C 66/43* (2013.01); *B29L 2031/26* (2013.01); *Y10S 277/921* (2013.01)

(58) Field of Classification Search
USPC .................. 277/644, 921; 49/498.1, 499.1
See application file for complete search history.

(56) References Cited

U.S. PATENT DOCUMENTS

| 2,659,940 | A | * | 11/1953 | Beck .......................... 49/498.1 |
| 3,038,217 | A | * | 6/1962 | Harris ......................... 428/121 |
| 3,378,957 | A | * | 4/1968 | Frehse ........................ 49/478.1 |
| 3,923,411 | A | * | 12/1975 | Berghman ..................... 404/64 |
| 4,255,903 | A | * | 3/1981 | Reynolds et al. ............. 49/498.1 |
| 6,479,580 | B1 | * | 11/2002 | Chorvath et al. .............. 524/588 |
| 6,786,007 | B2 | * | 9/2004 | Aritake ........................ 49/506 |
| 6,942,225 | B2 | * | 9/2005 | Gentemann et al. .......... 277/641 |
| 2006/0230686 | A1 | * | 10/2006 | Plum et al. .................. 49/498.1 |

FOREIGN PATENT DOCUMENTS

| DE | 2553130 | A | * | 6/1977 |
| DE | 2929837 | B | * | 1/1981 |
| FR | 2682154 | A1 | * | 4/1993 |
| GB | 2216163 | A | * | 10/1989 |

* cited by examiner

*Primary Examiner* — Robert E Fuller
(74) *Attorney, Agent, or Firm* — Novak Druce Connolly Bove + Quigg LLP

(57) ABSTRACT

A method of producing a seal comprising forming an elongated strip of a thermoplastic material having laterally spaced, interlockable portions; bending such strip along a longitudinal line disposed between the spaced interlockable portions to position the interlockable portions in opposed relation; and interlocking the interlockable portions together when such portions are disposed in opposed relation to provide a bulb segment and a mount segment.

12 Claims, 2 Drawing Sheets

METHOD OF MAKING A BULB SEAL

This is a Divisional application of U.S. patent application Ser. No. 12/332,576 filed on Mar. 11, 2008. The entire disclosure of U.S. patent application Ser. No. 12/332,576 is hereby incorporated by reference.

This invention relates to a seal and a method of making such seal.

BACKGROUND OF THE INVENTION

In the prior art, there has been developed a type of seal commonly referred to as a bulb seal. Such seal generally consists of a mount section formed of a thermoplastic material and a bonded bulb section formed of an elastomer material. Typically, such seals are formed by means of a dual durometer extrusion process. An example of such a seal is illustrated in FIG. 1. As shown, such a seal includes a mount section 11 having a substantially inverted U-shaped configuration with a pair of laterally extending, transversely aligned portions 12 and 13, formed of a thermoplastic material, and a bulb section 14 formed of a thermoplastic elastomer, bonded to the upper end of the mount section and having a polygonal cross-sectional configuration. Such seals widely have been used as hood-to-cowl seals in the automotive industry. To reduce the cost of such seals, a filler often is used in the thermoplastic material used to form the mount section of such seals.

In the production of such seals utilizing such materials and an extrusion forming process, however, it has been found that the use of fillers in the thermoplastic materials used to form the mount sections of the seal results in shrinkage of such sections which further results in certain distortions of the bulb section, often referred to as "smiles." To eliminate such distortions of the bulb sections of such seals, it has been a practice of using less filler in the thermoplastic material forming the mount sections of such seals which has had the effect of increasing the costs.

It thus is the principal object of the present invention to provide a seal of the type described in which increased amounts of filler may be used in the thermoplastic material used to form the mount sections of such seals, in order to reduce cost, while eliminating shrinkage of the mount sections which would otherwise cause a deformation of the shape of the bulb sections of such seals.

SUMMARY OF THE INVENTION

The principal object of the invention is achieved by providing a method of producing a seal of the type described which generally consists of forming an elongated strip of thermoplastic material having laterally spaced, interlockable means, bending such strip along a longitudinal line disposed between the spaced interlockable means to position such interlockable means in opposed relation and interlocking the interlockable means together when the interlockable means are disposed in opposed relation to provide a bulb section and a mount section. Preferably, such elongated strip is formed by a dual durometer extrusion process, the portions of such strip forming the mount section are formed of a thermoplastic material containing a filler in the range of 0% to 40%. The portion of such strip forming the bulb portion is formed of a thermoplastic elastomer and the interlockable means of such strip forming the mount section are interconnected by passing such elongated strip emerging from the extruder, between a pair pinch rollers. The desired, polygonal cross sectional configuration of the bulb section of the seal is formed by extruding the center portion of such strip with bends or creases which function to impart the desired configuration of such section. Any interlocking arrangement of the laterally spaced portions of the elongated strip may be utilized, sufficient to interlock upon being pinched to form the mount section. Preferably, one of the laterally spaced portions of such strip may be formed with a recess having a substantially T-shaped cross-sectional configuration and the other of such laterally spaced portions includes a projection having a cross sectional configuration substantially comparable and cooperable with the cross-sectional configuration of such recess, which is inserted into such recess during the pinching of such strip to interlock the laterally spaced portions of the strip to form the mount section of the seal. The fabrication of a seal in such manner permits the formation of a bulb seal with a mount section formed of a thermoplastic material containing a filler and a bulb section of a polygmal cross-sectional configuration without deformation, having the effect of producing a suitably configured seal at a comparatively low cost.

DETAILED DESCRIPTION OF THE PREFERRED EMBODIMENT OF THE INVENTION

Figure 1:
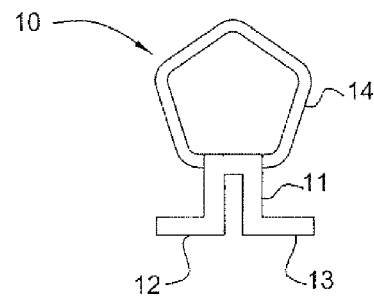
FIG. 1 is an end, elevational view of a bulb seal of the prior art.
Figure 2:
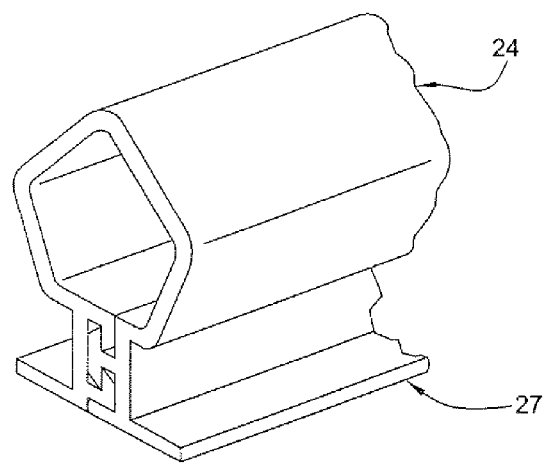
FIG. 2 is a perspective view of a portion of a seal produced by the method of the present invention.
Figure 3:
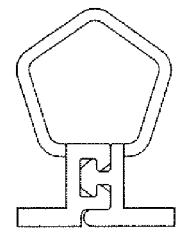
FIG. 3 is an end, elevational view of the seal shown in FIG. 2, illustrated in a smaller size.
Figure 4:
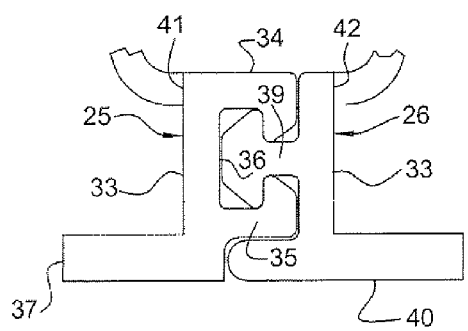
FIG. 4 is an enlarged, fragmentary view of a portion of the seal shown in FIG. 3, illustrating with greater clarity the interlocking arrangement of portions of the mount section of the seal.
Figure 5:
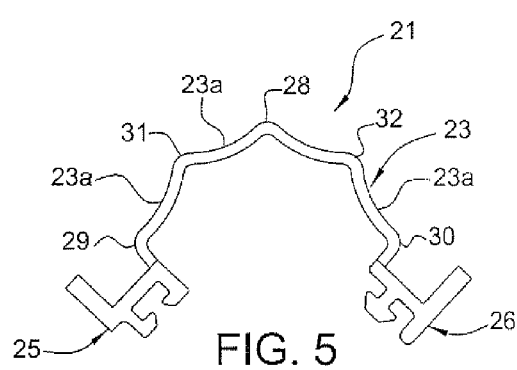
FIG. 5 is an end view of an elongated strip formed by a dual durometer extruder used to form the seal shown in FIGS. 2, 3 and 4.
Figure 6:
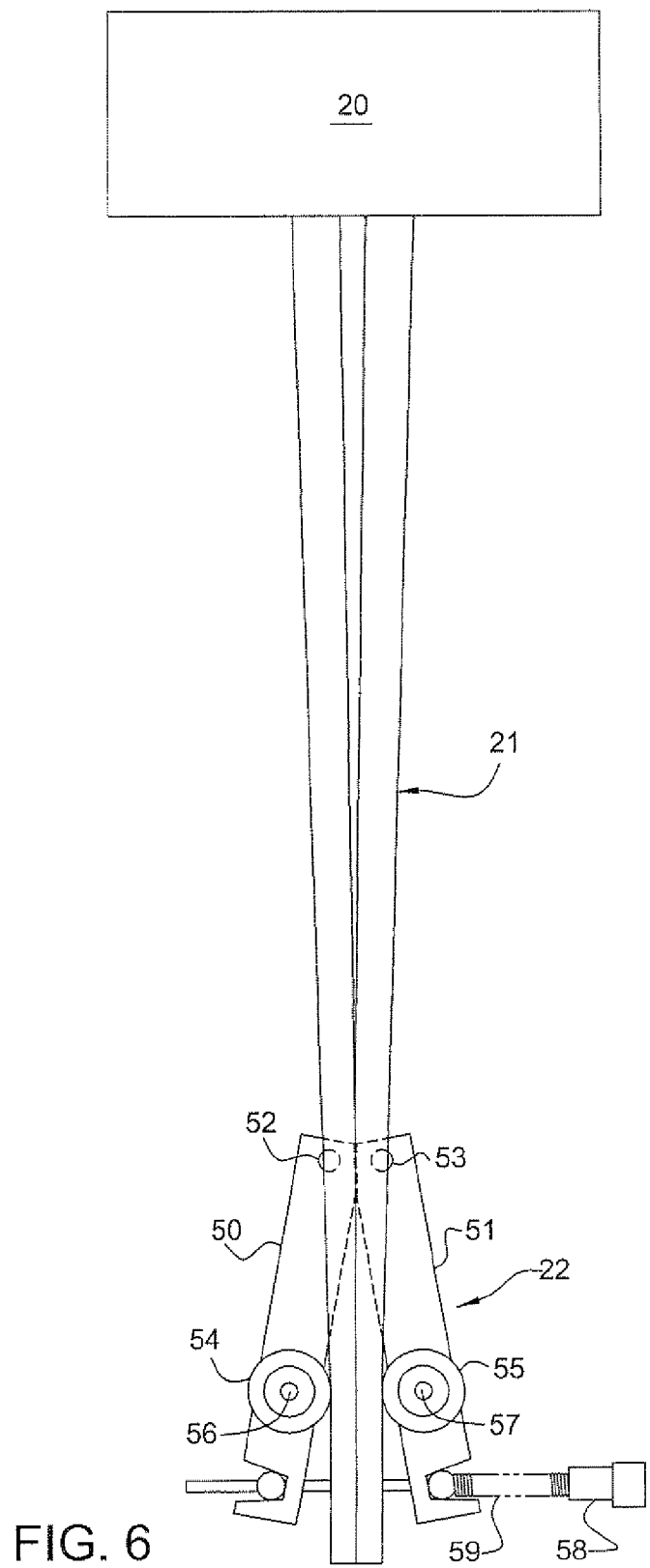
FIG. 6 is a top view of the elongated strip shown in FIG. 5 emerging from an extruder and formed by an assembly utilizing a pair of pinch rollers.

Referring to FIG. 6, there is illustrated a dual durometer extruder 20 operable to extrude an elongated strip 21 having a cross sectional configuration as shown in FIG. 5, and a forming assembly 22 functional to continuously form elongated strip 21 into an elongated seal with a configuration as shown in FIGS. 2 through 4. As shown in FIG. 5, elongated strip 21 includes an elongated portion 23 formable to provide a bulb section 24 of a finished seal and a pair of interlockable portions 25 and 26 bonded to the lateral ends of portion 23 which may be interlocked together to form a mount section 27 as shown in FIGS. 2 through 4. To facilitate the formation of the bulb section of the seal and provide a polygonal cross-sectional configuration of bulb section 24, strip portion 23 is provided with several bends or creases including a longitudinally disposed bend 28 along the center of the strip, a set of bends 29 and 30 disposed laterally of bend 28 adjacent the ends of portion 23 and a pair of bends 31 and 32 spaced laterally of bend 28 and disposed between bend 28 and each of bends 29 and 30. The segments of strip portion 23 disposed between the bends or creases may be formed with a shallow bow as at 23a which become planar when the bulb section is bent into its final configuration. Strip portion 23 further is formed of a thermoplastic elastomer material.

Portions of 25 and 26 of elongated strip 23 are provided with interlockable configurations so that when such sections are brought together in opposed relation and pinched, they will interlock. As best shown in FIG. 4, mount section 25 includes a first segment 33 having projecting parts 34 and 35 defining a longitudinally disposed recess 36 having a T-shaped cross-sectional configuration, and a segment 37 disposed substantially perpendicular to segment 33. Mount portion 26 includes a first segment 38 having a longitudinally disposed, projecting part 39 having a substantially T-shaped configuration which is adapted to be received in recess 36 when mount portions 25 and 26 are disposed in opposed relation and pinched together, and a segment 40 disposed substantially perpendicular to segment 38. The upper, outer portions of mount segments 33 and 38 are bonded to the ends of bulb portion 23 as at 41 and 42. To further facilitate the entry of segment part 33 in recess 36, the entry portion of recess 36 is beveled and the head portion of projecting part 39 is similarly beveled so that when the mount portions 25 and 26 are pinched together, such beveled surfaces will engage and facilitate the entry of projecting part 39 into recess 36 to interlock the two portions.

With portions 25 and 26 interlocked together as shown in FIG. 4, segments 37 and 40 will be disposed in transverse alignment to provide a surface for seating the seal, and segments 33 and 38 form an upright supporting the bulb section of the seal. Mount portions 25 and 26 are further formed of a thermoplastic material having sufficient elasticity to permit the interlocking of such portions in the manner described.

The apparatus shown in FIG. 6 including the extruder 20 and the forming assembly 22 are utilized to form elongated strip 21 as shown in FIG. 5 by extrusion and then bend and interlock such strip to provide a bulb seal as shown in FIGS. 2 and 3. Extruder 20 is of a conventional, dual durometer extruder with forming suitable dies in which a thermoplastic elastomer is injected to form portion 23 of the elongated strip, and a suitable thermoplastic having a durometer hardness greater than the durometer hardness of the thermoplastic elastomer is injected to form mount portions 25 and 26. In the conventional manner, the extruder functions to extrude strip 21 with mount portions 25 and 26 bonded to the ends of bulb portions 23 as at 41 and 42, with bends 28 through 32 formed in the bulb portion. Such strip, thus formed as shown in FIG. 5, is fed through assembly 22 which functions to draw mount portions 25 and 26 together and interlock them, forming a seal having mount and seal portions as shown in FIGS. 2 and 3. Assembly 22 consists of an apparatus having a pair of support arms 50 and 51 pivotally connected to a set of pins 52 and 53, a pair of pinch rollers 54 and 55 rotatably mounted on a set of pins 56 and 57 mounted on the support arms and a device 58 having a coil spring 59 operatively connected to the free ends of support arms 50 and 51 for urging such arms and correspondingly such rollers together. Each of the edges of such rollers is provided with a circumferential groove which is adapted to receive an edge of one of segments 37 and 40 to pinch mount portions 25 and 26 together to interlock such portions and thus form mount section 27. The orientation of the axes of the pins of rollers 56 and 57 may be adjusted as required and the biasing force on the support arms may be adjusted to provide the desired amount and direction of force to be applied to portions 25 and 26 to interlock such portions to form the mount portion of the seal. Once the formed seal emerges from assembly 22, it may be cut to desired lengths depending upon its particular application.

Mount section 27 formed of strip portions 25 and 26 is formed of a thermoplastic material having a durometer hardness greater than the durometer hardness of the thermoplastic elastomer material of bulb section 24 formed of strip portion 23. The durometer hardness of the mount section material may be in the range of 40 to 90 Shore D and may consist of propylene (PP), a thermoplastic elastomer (TPE), a thermoplastic vulcanizate (TPV) or a thermoplastic elastomeric polyolefin (TPO), filled with 0% to 40% of a filler including calcium carbonate, mica, talc, wood flour, glass beads or combinations thereof. For heavy duty applications, the mount section material may consist of a long chain alkylated orto-cresol (PBC), nylon or another resin. The durometer hardness of the material forming the bulb section of the seal may be in the range of 20 to 90 Shore A and preferably 35 5±Shore A, and such material may consist of TPE, TPO, TPV, a stymme/ethylene-butylene/styrene block copolymer (SEBS), RTPE or an ethylene-propylene-diene monomer (EPOM). For heavy duty applications, TPE, SEBS, TPV and PBC may be used.

The method of forming the seal of thermoplastic and thermoplastic elastomer materials as described permits the use of a filler in a thermoplastic matrix forming the mount section of the seal without distorting the formation of the bulb section of the seal, thus utilizing less thermoplastic material in forming the mount section of the seal, at a significant cost saving.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. A method of producing a seal comprising: forming an elongated strip by co-extruding a plurality of segments, wherein the plurality of segments comprise an intermediate segment, a first mount segment, and a second mount segment, wherein the intermediate segment has a first composition, wherein the first mount segment has a second composition, wherein the second mount segment has a third composition, wherein the first composition is different from the second composition, wherein the first composition is different from the third composition, wherein the first composition has a durometer hardness in the range of 20 to 90 Shore A, wherein the second composition and the third composition both comprise at least one filler, wherein the second composition and the third composition both comprise a material having a durometer hardness greater than the first composition; and bending the elongated strip to interlock the first mount segment and the second mount segment, wherein after bending, the intermediate section has a polygonal cross-sectional configuration.

2. The method according to claim 1, wherein the intermediate section is free from distortions when in the polygonal cross-sectional configuration.

3. The method according to claim 2, wherein the intermediate section is free from smiles when in the polygonal cross-sectional configuration.

4. The method according to claim 1, wherein the at least one filler is selected from the group consisting of calcium carbonate, mica, talc, wood flour, glass beads, and combinations thereof.

5. The method according to claim 1, wherein the first composition comprises one selected from the group consisting of a thermoplastic elastomer, a thermoplastic elastomeric polyolefin, a thermoplastic vulcanizate, a styrene/ethylene-butylene/styrene block copolymer, an ethylene-propylene-diene monomer, and combinations thereof.

6. The method according to claim 1, wherein the second composition comprises one selected from the group consisting of propylene, a thermoplastic elastomer, a thermoplastic vulcanizate, a thermoplastic elastomeric polyolefin, and combinations thereof.

7. A seal comprising an elongated strip, wherein the elongated strip comprises a plurality of co-extruded segments, wherein the plurality of co-extruded segments comprise an intermediate segment, a first mount segment, and a second mount segment, wherein the intermediate segment has a first composition, wherein the first mount segment has a second composition, wherein the second mount segment has a third composition, wherein the first composition is different from the second composition, wherein the first composition is different from the third composition, wherein the first composition has a durometer hardness in the range of 20 to 90 Shore A, wherein the second composition and the third composition both comprise at least one filler, wherein the second composition and the third composition both comprise a material having a durometer hardness greater than the first composition; and wherein the elongated strip has a bent configuration in which the first mount segment and the second mount segment interlock and the intermediate section has a polygonal cross-sectional configuration.

8. The seal according to claim 7, wherein the intermediate section is free from distortions when in the polygonal cross-sectional configuration.

9. The seal according to claim 7, wherein the intermediate section is free from smiles when in the polygonal cross-sectional configuration.

10. The seal according to claim 7, wherein the at least one filler is selected from the group consisting of calcium carbonate, mica, talc, wood flour, glass beads, and combinations thereof.

11. The seal according to claim 7, wherein the first composition comprises one selected from the group consisting of a thermoplastic elastomer, a thermoplastic elastomeric polyolefin, a thermoplastic vulcanizate, a styrene/ethylene-butylene/styrene block copolymer, an ethylene-propylene-diene monomer, and combinations thereof.

12. The seal according to claim 7, wherein the second composition comprises one selected from the group consisting of propylene, a thermoplastic elastomer, a thermoplastic vulcanizate, a thermoplastic elastomeric polyolefin, and combinations thereof.

* * * * *